(12) United States Patent
May

(10) Patent No.: US 10,138,974 B2
(45) Date of Patent: *Nov. 27, 2018

(54) FREQUENCY HOPPING FOR SMART AIR SPRINGS

(71) Applicant: Stemco Products, Inc., Charlotte, NC (US)

(72) Inventor: Lutz May, Berg (DE)

(73) Assignee: STEMCO PRODUCTS, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,112

(22) Filed: Apr. 27, 2016

(65) Prior Publication Data

US 2016/0312849 A1 Oct. 27, 2016

Related U.S. Application Data

(63) Continuation of application No. 14/085,325, filed on Nov. 20, 2013, now Pat. No. 9,349,281.

(30) Foreign Application Priority Data

Nov. 21, 2012 (EP) ..................................... 12193661

(51) Int. Cl.
*F16F 9/32* (2006.01)
*G08C 17/02* (2006.01)
(Continued)

(52) U.S. Cl.
CPC ............ *F16F 9/3292* (2013.01); *B60G 11/27* (2013.01); *B60N 2/525* (2013.01); *F16F 9/05* (2013.01);
(Continued)

(58) Field of Classification Search
CPC ............ H04B 1/713; B60N 2002/0272; G01L 37/003; F16F 9/05; G01M 17/04; B60G 11/26; G01S 15/08
USPC ......... 340/870.07, 825.54, 447, 442; 73/161, 73/11.07, 146.5, 146, 146.2, 146.8; 267/64.19, 64.23, 64.27
See application file for complete search history.

(56) References Cited

U.S. PATENT DOCUMENTS 6,036,179 A * 3/2000 Rensel ........................ 267/64.11
2003/0224729 A1 * 12/2003 Arnold ............................ 455/59
(Continued)

*Primary Examiner* — Mirza Alam
(74) *Attorney, Agent, or Firm* — Perkins Coie LLP

(57) ABSTRACT

The subject invention relates to an air spring height sensor comprising a transmitter unit (102) for transmitting a height measuring signal, a receiver unit (101) for sensing a height signal, a carrier frequency switching unit (103), and an evaluation unit (200). The receiver unit and the transmitter unit are adapted for being mounted to opposing mounting elements (10, 20) of an air spring (1). The transmitter unit is switchable between different carrier frequencies (121, 122) of a height measuring signal. The evaluation unit comprises a frequency filter (213) being switchable between different carrier frequencies, wherein the carrier frequency switching unit is adapted for switching the carrier frequency of the frequency filter at a predetermined first point of time and the corresponding carrier frequency of the transmitter unit at a predetermined second point of time, wherein the first point of time is prior to the second point of time.

20 Claims, 6 Drawing Sheets

(51) Int. Cl.
 *F16F 9/05* (2006.01)
 *H04B 1/713* (2011.01)
 *B60N 2/52* (2006.01)
 *B60G 11/27* (2006.01)
 *B60N 2/02* (2006.01)

(52) U.S. Cl.
 CPC ............ *G08C 17/02* (2013.01); *H04B 1/713* (2013.01); *B60G 2400/252* (2013.01); *B60N 2002/0272* (2013.01); *F16F 2230/08* (2013.01)

(56) References Cited

U.S. PATENT DOCUMENTS

| | | | |
|---|---|---|---|
| 2008/0148809 A1* | 6/2008 | Haney et al. | 73/11.04 |
| 2009/0020928 A1* | 1/2009 | Nordmeyer | 267/64.19 |
| 2011/0184668 A1* | 7/2011 | Juchniewicz et al. | 702/45 |
| 2015/0025817 A1* | 1/2015 | Ten Kate | 702/50 |

* cited by examiner

FREQUENCY HOPPING FOR SMART AIR SPRINGS

This application claims benefit of European Patent Application Serial No. EP 12193661.1, filed on Nov. 21, 2012. The teachings of European Patent Application EP 12193661.1 are incorporated herein by reference in their entirety.

FIELD OF THE INVENTION

The invention relates to distance measurement and in particular to an air spring height sensor and an air spring for a vehicle having an air spring height sensor or a distance sensor and an air spring height measuring method.

BACKGROUND OF THE INVENTION

Height or distance measurement has a wide variety of possible applications. However, the environment where the height measurement is being made can present a wide variety of challenges. This is particularly the case in situations where height or distance measurements are being made in automotive applications. For example, in measuring the height of a vehicle frame above the surface of a road, challenges are typically presented by road noise, dirt, dust, and vibrations which are normally present in the environment surrounding the vehicle where the measurement is being taken.

DE 10 2006 017 275 A1 and EP 1845278 A1 describe an air spring having an integrated positioning device, wherein the distance between two parts of the air spring can be measured by an analogue proximity sensor. Commonly used proximity sensors are, for example, based on an ultrasonic measurement principle which is very sensitive in noisy and vibrating environments, as the acoustic noise and the ultrasonic measurement principle are based on the same physical principle, i.e. sound propagation. These pneumatic air springs have an integrated height measuring device, a pressure chamber or an inner chamber. The exterior of the inner chamber is aligned in the analog proximity sensor and a metal plate is arranged opposite to the interior of the proximity sensor. The proximity sensor and the metal plate are formed pre-adjustable to each other.

Further, DE 10 2008 064 647 A1 describes an air spring for a vehicle having a measuring device, which measuring device may transmit data and energy via predetermined and fixed distance contactless. This pneumatic cushioning equipment has a base unit which has a pressure source and a valve unit which has an air supply made of non-metallic material, particularly plastic. A switching valve of the base unit is provided between the pressure source and appropriate valve unit of the arranged air supply.

EP 2 366 972 and United States Patent Publication No. 2012/0056616 A1 describe a sensor device for height measurement in an air spring and a corresponding method allowing determining changes in a working stroke of the air spring. These publications more specifically disclose a sensor device for a height measurement, comprising: a transceiving coil arrangement including at least one transceiving coil; a transmitting drive unit; a receiver unit; a reference coil arrangement; and a reference control unit, wherein the transceiving coil arrangement is coupled to both the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, and wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

SUMMARY OF THE INVENTION

A technical objective of the present invention is to provide a fault resistant and interference resistant air spring height sensor and air spring height measuring method. This objective is achieved through the practice of the invention which is disclosed and claimed herein.

According to an aspect of this invention, an air spring height sensor is provided which comprises a transmitter unit for transmitting a height measuring signal, a receiver unit for sensing a height signal, a carrier frequency switching unit and an evaluation unit. The transmitter unit is switchable between different carrier frequencies of a height measuring signal. The evaluation unit comprises a frequency filter being switchable between different carrier frequencies. The carrier frequency switching unit is adapted for switching the carrier frequency of the frequency filter at a predetermined first point of time and the corresponding carrier frequency of the transmitter unit at a predetermined second point of time, wherein the first point of time is prior to the second point of time.

The air spring height sensor as described above and hereinafter enables height measurement and/or distance measurement of an air spring and in particular of a current value of an air spring working stroke by using different carrier frequencies such that an interference appearing at one of the carrier frequency does not affect or influence the measured value using the second carrier frequency.

A multitude of frequencies may be used as carrier frequencies, for example two different frequencies or more than two different frequencies like three, four or five and more frequencies. In one embodiment of this invention, the carrier frequency switching unit may be adapted to switch between the available carrier frequencies in a given order or sequence which may periodically repeat as well as change the repetition cycle of the carrier frequencies.

The air spring height sensor as described above and hereinafter may be used in air springs and may be mounted at the under-side of a vehicle's chassis. Therefore, it may be exposed to unwanted EMI (Electromagnetic Interference) signals that may affect the height sensor function and performances. For example, assuming that the operational frequency of the air spring height sensor is set to 50 kHz, and further assuming that the vehicle is driving or parking over a road-built-in inductor-based measurement loop (as needed for smart traffic lights and by barriers in car-parks) that may use the same operational frequency, then under certain conditions the road-built-in inductor-loop may confuse the receiver circuit of an air spring height sensor. The results may be (when not detected by the sensor built-in controller) faulty measurements, or no measurements at all. The air spring height sensor of this invention can be employed to prevent this from happening rather than utilizing costly magnetic shielding. The air spring height sensor as described above and hereinafter is capable of utilizing more than one operational frequency and can hop back and forth between those multiple frequencies. For example, the air spring height sensor may initially operate on a transmitter/receiver frequency of 50 kHz, and can then switch to another frequency, such as 80 kHz. A preferred embodiment of the measurement frequency changing method will be described in more detail below.

An alternative measurement frequency changing method is the so called "two out of three" variant. This type of "frequency hopping" is widely used in the automotive industry. The system performs sensor measurements at three distinct (and predetermined) operational frequencies. After the three measurements have been taken (each of them at a different operational frequency) the controller then compares each of the three measurements with each other. In the event that an EMI (Electromagnetic Interference) signal has blocked one frequency, then two measurements will be matching (will be the same) and one measurement (of the blocked operational frequency) will be different in comparison to the other two. The controller will then forward the measurement results of the two measurements that are in agreement (matching) with each other. This method may be characterized as follows: Before a new measurement result is available, three measurements have to be taken first (one after another). This may be time consuming and may reduce the potential system measurement speed (reduced Sensor Signal Band Width). The three operational frequencies may need to be predetermined and may provide limited flexibility in case the EMI signal is blocking more than one operational frequency. In case the measurements will be taken in parallel, then the electronic circuit required may be very complex as three filter channels of a fixed frequencies have to be provided.

Another alternative measurement frequency changing method is the so called "any frequency" variant. When using an electronics circuit design that allows any operational frequency (within a limited frequency range) then the following solution may be applicable: The first measurement will be taken using a default operational frequency. While the sensor measurements are taken, the controller is scanning other potential operational frequencies whether they are "free" (no signals on the scanned frequency) or "blocked" (signals detected on the scanned frequency without being sent by the transmitting unit of the air spring height sensor) by an EMI signal. At a predetermined time interval the controller will switch from the currently used operational frequency to another frequency that has been classified as being "free" by the controller. Then the cycle begins again: While the sensor system is using the "free" frequency channel, the controller is looking for another "free" frequency channel, before switching to it. This way the sensor system can provide real-time measurements to the signal output and any frequency can be used (within a predefined frequency range). This method may be characterized as follows: Continuous, real-time, measurement signal output (no delay caused by switching frequency channels) may be provided within a freely usable frequency range which needs not to rely onto specific frequencies (thus, higher system safety may be provided). Further a very small sensor electronics design and thus lower costs and smaller space requirements may be facilitated. This measurement frequency changing method may be only possible when using programmable filter techniques (either analogue programmable filter circuits or digital programmable filter circuits.

The air spring height sensor as described above and hereinafter enables to first verify whether a first carrier frequency is free and if it is free to carry out distance measurement or height measurement. If the first carrier frequency is not free, i.e. there are EMI or other signals on the first carrier frequency, then it is known that the subsequently carried out height measurement will probably not be accurate. One advantage of this approach may be that no feedback or signal transmission between the receiver unit and the transmitter unit is necessary when the first carrier frequency is not free. The receiver unit evaluates that the measurement in the next step may not be accurate (as the first carrier frequency is not free) and thus may not use the measurement carried out in the next step.

According to an embodiment of the invention, the receiver unit and the transmitter unit are adapted for being mounted to opposing mounting elements of an air spring.

Thus, one of the receiver unit and the transmitter unit may be operated as a passive element or an element independent of signal and power wires. One of the receiver unit and the transmitter unit, in particular the transmitter unit, may be connected to a signal generator and to the evaluation unit, wherein the other one, i.e. the receiver unit, is located opposite to the transmitter unit as an independent unit.

In an alternative embodiment, the receiver unit may be arranged at the same side of the height sensor, wherein a passive magnetic or ferromagnetic measuring plate is arranged opposite of both the transmitter unit and the receiver unit such that the measuring plate is adapted as a reference element for measuring the height, i.e. the distance between the measuring plate at the one side and the transmitter unit and the receiver unit at the other side.

According to a further embodiment of the invention, the evaluation unit is adapted for detecting after the first point of time and before the second point of time whether the carrier frequency is sufficiently free of interferences and for subsequently evaluating the sensed height signal when the carrier frequency of the transmitter unit corresponds to the carrier frequency of the frequency filter and the carrier frequency is sufficiently free of interferences.

The evaluation of the status (free or blocked) of the first carrier frequency is possible as the first point of time for switching the carrier frequency of the frequency filter at the receiver unit is prior to the second point of time for switching the corresponding carrier frequency of the transmitter unit. Thus, the evaluation unit is enabled to verify whether there is a signal on the carrier frequency in question, as the transmitter starts sending on the carrier frequency in question with a given time delay, i.e. the difference between the second point of time and the first point of time.

Whether the carrier frequency is sufficiently free of interferences is determined by measuring the signal noise content, i.e. the carrier frequency is sufficiently free of interferences if the signal to noise ratio of the height measurement signal and the noise detected during the status detection is so high that the detection and recognition of the height measurement signal is doubtless possible. Additionally, a noise signal threshold may be defined and set that may determine when a carrier frequency is considered to be "free" or "blocked".

According to a further embodiment of the invention, the carrier frequency switching unit is adapted for alternately switching the carrier frequency of the frequency filter and the transmitter unit between a first carrier frequency and a second carrier frequency.

Before switching from the first carrier frequency to the second carrier frequency, the evaluation unit verifies the status of the second carrier frequency during the transmitter unit is still sending using the first carrier frequency. After the transmitter unit has changed to the second carrier frequency, the height is being measured using the second carrier frequency and depending on the status of the second carrier frequency the measured height value is classified as incorrect/faulty (when the status of the second carrier frequency is "blocked") or as correct/free of interference (when the status of the second carrier frequency is "free"). A faulty height value may be rejected or discarded by the evaluation unit.

According to a further embodiment of the invention, the carrier frequency switching unit is adapted for periodically switching the carrier frequency of the receiver unit at a periodic predetermined first point of time and the corresponding carrier frequency of the transmitter unit at a respective predetermined second point of time.

Thus, the switching of the carrier frequency is carried out regularly and enables a continuously height measurement under changing environmental conditions like changing frequencies of interferences.

According to a further embodiment of the invention, the air spring height sensor is adapted for switching from one of the first carrier frequency and the second carrier frequency to the other one from the first carrier frequency and the second carrier frequency upon the result of detecting whether the carrier frequency is sufficiently free of interferences.

This embodiment of the air spring height sensor may require a signal connection from the receiver unit or from the evaluation unit to the carrier frequency switching unit as the switching from the first carrier frequency to the second carrier frequency or vice versa is dependent upon the result of the status detection or verification of the second carrier frequency or the first carrier frequency, i.e. of the carrier frequency to be switched to. In case the status detection supplies the status "blocked" for the carrier frequency of the next frequency cycle, the carrier frequency may not be switched.

According to a further embodiment of the invention, the air spring height sensor is adapted for interrupting the transmission of the transmitter unit at least partially between the first point of time and the second point of time.

The transmission interruption may enable a synchronization of the receiver unit and the transmitter unit. The receiver unit may detect the signal interruption and may thus be able to carry out the height measurement using a given carrier frequency after the time delay between the first point of time and the second point of time.

According to a further embodiment of the invention, the air spring height sensor is adapted for interrupting the transmission of the transmitter unit between the first point of time and the second point of time. Thus, the transmitter does not send any signal between the first point of time and the second point of time which may enable a more accurate detection of the status of the next carrier frequency.

According to a further embodiment of the invention, the carrier frequency is between 1 kHz and 1 MHz, in particular the carrier frequency is between 10 kHz and 100 kHz. The given frequency ranges may provide high quality transmission characteristics and low EMI interferences.

According to a further embodiment of the invention, an alternating rate from one of the first carrier frequency and the second carrier frequency to the other one from the first carrier frequency and the second carrier frequency is between 1 Hz and 1 kHz, in particular the alternating rate is between 10 Hz and 100 Hz.

Thus, a sufficiently high rate for providing new height measurement values may be obtained, even when one or more height measurement values may be rejected or discarded due to a blocked carrier frequency.

According to a further embodiment of the invention, the ratio of the duration between the first point of time and the second point of time and the duration where the carrier frequency of the transmitter unit corresponds to the carrier frequency of the frequency filter is between 0.2 and 5, in particular between 0.5 and 2, in particular between 0.8 and 1.2, in particular 1.

A ratio in the given value ranges may provide good synchronization characteristics between the transmitter unit and the frequency filter and good status detection properties.

According to a further aspect of the invention, an air spring is provided, which comprises a first mounting element being adapted for being mounted to a first vehicle portion, a second mounting element being adapted for being mounted to a second vehicle portion being springy movable with respect to the first vehicle portion, an air volume limited by a resilient belly having a first edge and a second edge, which belly with the first edge is sealed to the first mounting element and with the second edge is sealed to the second mounting edge and an air spring height sensor as described above and hereinafter. The transmitter unit is mounted to the first mounting element and the receiver unit is mounted to the second mounting element so as to sense a height signal with respect to the first mounting element.

The air spring height sensor as described above and hereinafter enables an accurate and fault resistant height measurement of a working stroke of the air spring, in particular when being mounted to a moving vehicle and exposed to EMI or other radio signal sources.

According to a further aspect of the invention, an air spring height measuring method is provided, the method comprising the following steps: in a first step switching at a predetermined first point of time a carrier frequency of a frequency filter of an evaluation unit, evaluating a sensed height signal of a receiver unit being mounted to a first mounting element of an air spring, from one of a first carrier frequency and a second carrier frequency to the other one of the first carrier frequency and the second carrier frequency, in a second step detecting after the first point of time whether the carrier frequency is sufficiently free of interferences, in a third step switching at a predetermined second point of time the carrier frequency of a transmitter unit, for transmitting a height measuring signal, which transmitter unit is being mounted to a second mounting element of an air spring, to a corresponding carrier frequency of the frequency filter, in a fourth step evaluating the sensed height signal when the carrier frequency of the transmitter unit corresponds to the carrier frequency of the frequency filter and if the carrier frequency is sufficiently free of interferences.

It should be noted that the description with regard to the air spring height sensor and with regard to the air spring apply in an analog manner to the air spring height measuring method as described above and hereinafter.

The method allows an accurate and fault tolerant and resistant height measurement of a working stroke of the air spring as in a first step a status detection of the carrier frequency intended to be used in the next step is carried out such that an information is provided regarding the accuracy of the measured height value of the next step, i.e. the information regarding the height value of being correct when the status of the carrier frequency intended to be used in the next step is "free" or otherwise of being corrupted or not applicable in case the status of the carrier frequency is "blocked".

According to an embodiment of the invention, the step switching the carrier frequency of the frequency filter comprises periodically switching the carrier frequency at a periodic predetermined first point of time and the step switching the carrier frequency of the transmitting unit comprises periodically switching the carrier frequency at a respective periodic predetermined second point of time.

With regard to this feature, reference is made to the description above regarding to periodically switching the carrier frequency of the frequency filter and of the transmitting unit.

According to a further embodiment of the invention, the method comprises, upon the result of detecting whether the carrier frequency is sufficiently free of interferences, switching at a predetermined second point of time the carrier frequency of a transmitter unit from one of the first carrier frequency and the second carrier frequency to the other one of the first carrier frequency and the second carrier frequency, and, upon the result of detecting whether the carrier frequency is not sufficiently free of interferences, switching back at the predetermined second point of time carrier frequency of the frequency filter.

According to a further embodiment of the invention, the method further comprises the step of interrupting the transmission of the transmitter unit at least partially between the first point of time and the second point of time.

These and other aspects of the present invention will become apparent from and elucidated with reference to the exemplary embodiments described hereinafter.

Figure 1:
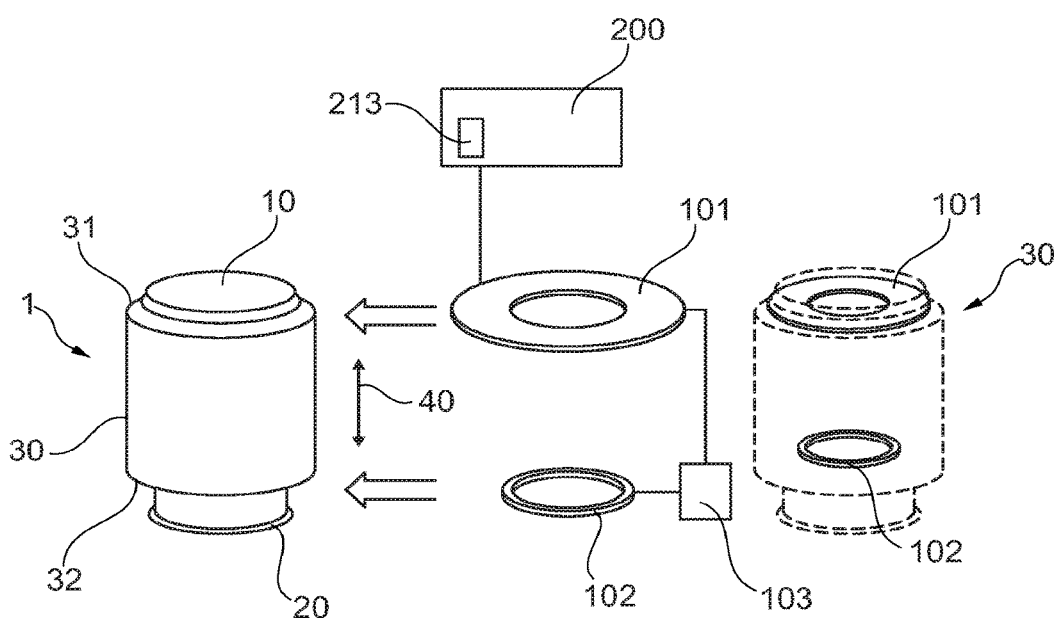
FIG. 1 illustrates an air spring according to an exemplary embodiment of the invention.

The reference numerals as used herein with reference to the drawings provided hereby are as follows:
1 air spring
2 first vehicle portion
3 second vehicle portion
10 first mounting element
20 second mounting element
30 belly
31 first edge
32 second edge
40 working stroke
41 physical upper limit of the air spring
42 upper limit of the working stroke
43 lower limit of the working stroke
44 physical lower limit of the air spring
45 normal operating height of the air spring
50 height measurement signal
100 air spring height sensor
101 receiver unit
102 transmitter unit
103 carrier frequency switching unit
110 receiver filter frequency
111 first frequency
112 second frequency
120 transmitter frequency
121 first carrier frequency
122 second carrier frequency
125 transmission break
130 time delay between t1 and t2
140 measuring cycle
144 measuring process (on first frequency)
148 frequency checking process (for second frequency)
151-157 process steps
190 time line
200 evaluation unit
213 frequency filter
t1 first point of time
t2 second point of time

DETAILED DESCRIPTION OF THE INVENTION

FIG. 1 illustrates an air spring 1 with a first mounting element 10 and a second mounting element 20. The air spring further comprises a belly 30 with a first edge 31 and a second edge 32. The first edge 31 of the belly 30 is mechanically interconnected with the first mounting element 10 and the second edge 32 is mechanically interconnected with the second mounting element 20.

The belly encloses an air volume such that the working stroke 40 of the air spring represents a movement of one of the first mounting element 10 and the second mounting element 20 towards the other one of the first mounting element 10 and the second mounting element 20.

A receiver unit 101 in form of a coil and a transmitter unit 102 are located within the air volume of the air spring as indicated by the air spring illustrated in dotted lines. The receiver unit 101 is located close to the first mounting element 10 of the air spring and the transmitter unit 102 is located close to the second mounting element 20 of the air spring. Both, the receiver unit and the transmitter unit may be designed as coreless coils such that a working stroke 40 of the air spring is not reduced by these devices which are located within the air volume of the air spring.

The air spring height sensor 100 comprises a carrier frequency switching unit 103 which is connected to the transmitter unit 102 and to the receiver unit 101 as to switch the carrier frequency of the frequency filter at a predetermined first point of time and the corresponding carrier frequency of the transmitter unit at a predetermined second point of time. The carrier frequency switching unit 103 may in particular be located outside of the belly 30 and in particular outside of the air spring 1.

The air spring height sensor 100 further comprises an evaluation unit 200 with a frequency filter 213 which is functionally connected to the receiver unit 102 and which is switchable between different carrier frequencies.

FIG. 1 shows the air spring and the air spring height sensor in both the mounted and the unmounted state, wherein on the left side of the drawing the unmounted state and on the right side of the drawing the mounted state is depicted.

The air spring as described above and hereinafter may in particular be a smart air spring with an air spring height sensor as described above and hereinafter as air spring level unit or height measurement system. The air spring may in particular be an air spring with intelligent sensor and actuator functions. One of the important features is the integrated air spring height sensor. The function of the air spring height sensor is it to measure with reasonable accuracy the current absolute axial position of the air spring, i.e. the distance between the first mounting element and the second mounting element. In other words it specified the current length of the air spring. Such a sensor solution may require its own, application specific electronics which will be described in more detail below.

The air spring height sensor as described above and hereinafter may offer the following features: reduced or no sensitivity to electromagnetic interferences (EMI), insensitive or fully compensated for the potential effects caused by temperature and temperature fluctuations or variations, reasonably high signal resolution for the targeted measurement range, no shortening of the original operating or working stroke of the air spring, low electric current consumption, fast signal response with a wide signal bandwidth range, low or no emissions of electromagnetic interferences, insensitive to metallic objects of different kinds that may be placed near the air spring or placed inside the air spring, wherein in the latter limits of maximum size and maximum mass of the metallic object apply, insensitive to changes of humidity, dirt and dust to a certain extent.

The air spring height sensor as described above and hereinafter is not limited to air spring applications. Wherever a large measurement stroke of a linear-position-sensor is required, this described electronics solution may be applicable. Large measurement stroke means that the signal amplitude ratio may change in exponential ratio, for example in a range greater than 1:100. Examples include, but are not limited to, height and position changes in vehicle suspension system including all types of vehicles, such as trucks, passenger cars, rains, planes, motor bikes, etc., control of industrial processing equipment like tooling, milling, drilling, mixing, filling, shifting, sorting, like luggage sorting and handling at airports, parcel sorting at the mail service, etc., test equipment like flight simulator, engine test bed, furniture reliability tests, sports equipment testing, etc., large scale, indirect load measurement systems like weight-on-beam design, large scale mining equipment like oil drilling, tunneling, steering and position control systems in ships (rudder position), planes (flaps, rudder,). Other applications for this application may be measuring accurately the distance to a metallic object, like when the engine (locomotive) of a train is coupling to a rail-road wagon, or when a pushing-truck at the airport is automatic or semi-automatic coupling to the front-wheel of a plain. When implementing an air spring height sensor as described above and hereinafter into a smart air spring system, it may be important not to shorten the actual mechanical stroke of the air spring.

There may exist several different ways to integrate an air spring height sensor as described above and hereinafter into an air spring. FIG. 1 shows one of these possibilities, where the transmitter unit 102 is placed at one end of the air spring body, i.e. at the second mounting element 20 (like the bottom) and the receiver unit 101 is placed at to other end of the air spring body, i.e. at the first mounting element 10. For example, other design solutions are that the transmitter unit and the receiver unit are placed at one and the same side (not shown in FIG. 1).

Figure 2:
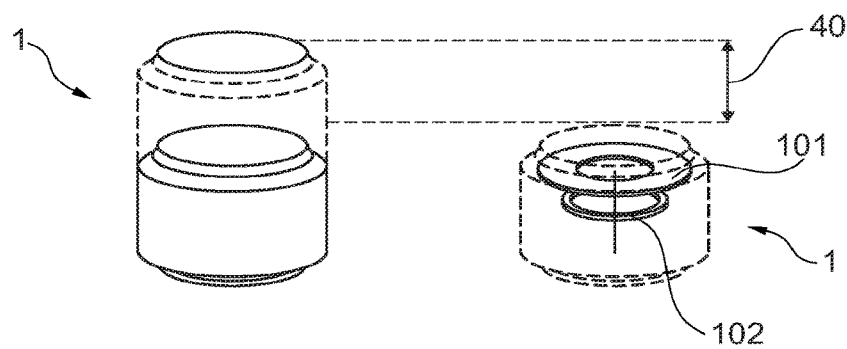
FIG. 2 illustrates an air spring according to a further exemplary embodiment of the invention.

FIG. 2 illustrates an air spring 1 in a first state or in an uncompressed state on the left side of the drawing and the air spring 1 in a second state or in a compressed state on the right side of the drawing. The difference between the length of the air spring in the first state and in the second state corresponds to the maximum working stroke of the air spring. As the transmitter unit and the receiver unit are designed as coils with a minimum extension in direction of the working stroke, the working stroke of the air spring is almost not or not reduced when arranging the air spring height sensor as described above and hereinafter within the air volume of the air spring.

A manufacturer's specification of an air spring may define the usable working stroke range 40 which is shown in connection with the first state and the second state of the air spring in FIG. 2. In particular, the user of the air spring should not alter the air spring as to inflate it any higher or deflate it any lower than described in the manufacturer's specification. Going beyond the specified "Min/Max" positions may result in damages to the rubber belly of the air spring. In any case, to avoid damaging the air spring height sensor components when the air spring may get fully deflated, the individual sensing components transmitter unit and receiver unit have to be spaced sufficiently so that they never crash into each other at the minimum distance or when the air spring takes the second state. In a preferred embodiment, the air spring height sensor as described above and hereinafter may be built in such way that the transmitter unit and the receiver unit may come very close to each other when the air spring is fully deflated or collapsed.

The second state is the state in which the sensor signal transfer is most efficient and therefore the largest height signal can be expected at the output of the passive or active working signal receiver. This signal may also be called the original or untreated height signal.

When moving from the second state to the first state, the distance between the transmitter unit and the receiver unit steadily increases such that the original height signal is decreasing, wherein the decreasing may occur exponentially.

Figure 3:
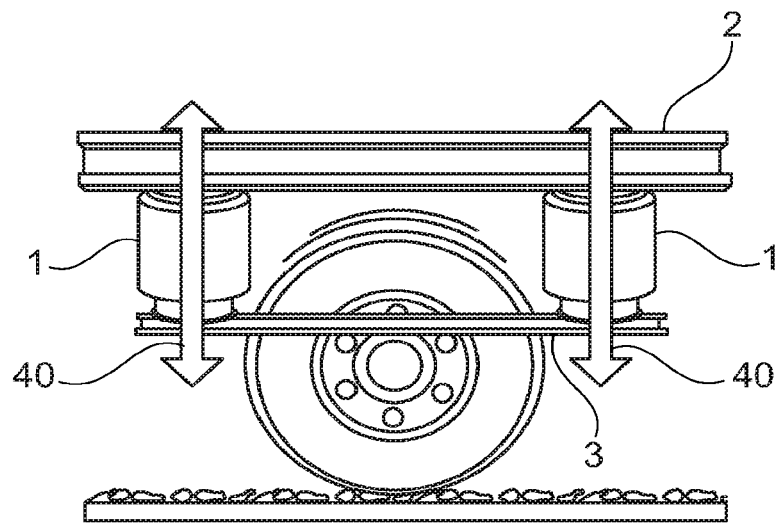
FIG. 3 illustrates a wheel suspension with an air spring according to a further exemplary embodiment of the invention.

FIG. 3 illustrates a wheel suspension of a vehicle with two air springs 1 as described above and hereinafter. The second vehicle portion 3, i.e. the movable part of the wheel suspension which is mounted to the wheel, is adapted to move along the arrows 40, which correspond to the measuring distance and the working stroke of the air springs, wherein one mounting element of the air spring is attached to the second vehicle portion. The other one of the mounting elements of the air spring is mounted to the first vehicle portion 2.

Figure 4:
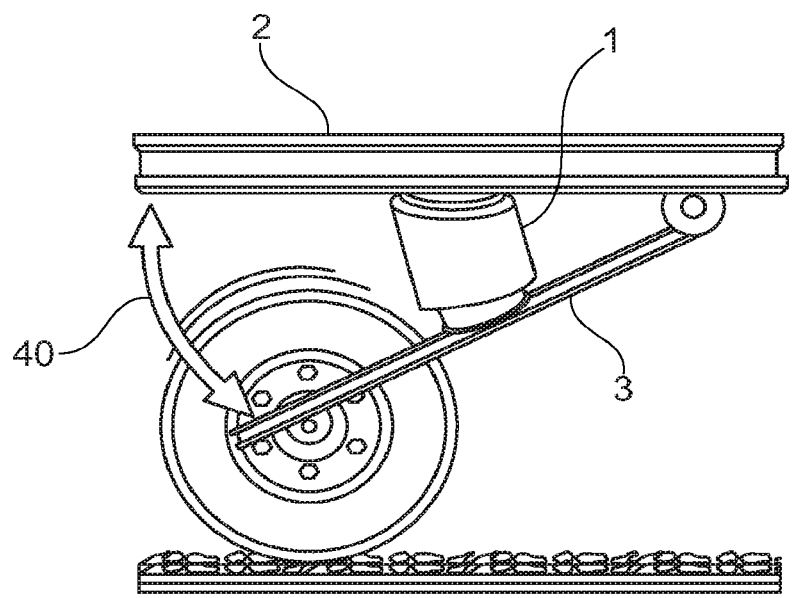
FIG. 4 illustrates a wheel suspension with an air spring according to a further exemplary embodiment of the invention.

FIG. 4 illustrates an alternative wheel suspension of a vehicle with one air spring 1, wherein one of the mounting elements of the air spring is attached to the movable second vehicle portion 3 and the other one of the mounting elements is attached to the first vehicle portion 2. The second vehicle portion is rotatably movable around a hinge which mechanically interconnects the first vehicle portion and the second vehicle portion.

Figure 5:
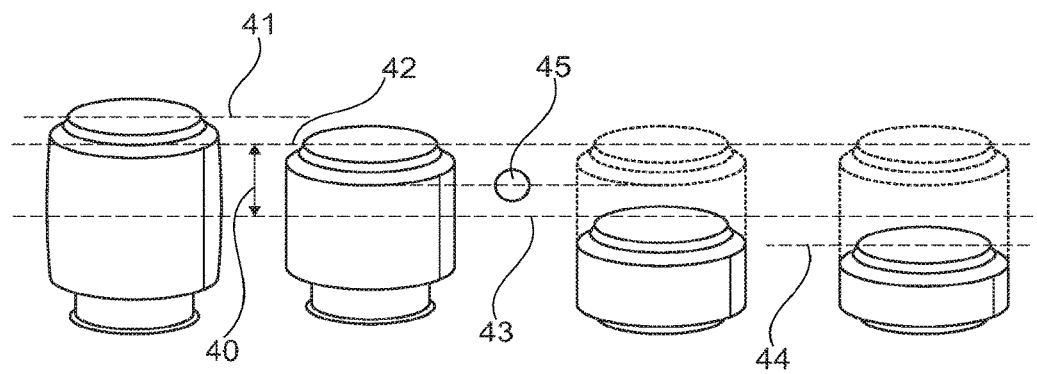
FIG. 5 illustrates the working stroke of an air spring according to a further exemplary embodiment of the invention.

FIG. 5 illustrates an air spring 1 having different states between the physical upper limit 41 and the physical lower limit 44. The air spring 1 has its upper limit 42 of the working stroke 40 below the physical upper limit and above the normal operating height of the air spring or the riding height 45. The lower limit 43 of the working stroke 40 is arranged below the riding height 45 and above the physical lower limit 44.

The larger the targeted measurement range of an air spring integrated air spring height or distance sensor needs to be, the more costly it may also get. As the received signal is smallest when the air spring is fully expanded, a measurement range reduction of 10 mm and more may represent measurable material and cost savings.

When thinking and planning to design and built an air spring height sensor for an air spring application, it seems to be obvious that the required measurement range has to cover the entire movement range of the air spring: starting when fully contracted (pushed together, physical lower limit 44) to when fully expanded (fully stretched, physical upper limit 41). However, these two extreme cases may actually not be used under normal operational conditions as there may be a risk of damaging the air spring when stretching them to their limits in the upper direction or in the lower direction.

To ensure a long product life time of the air spring, the device may not be used beyond the upper limit 42 and the lower limit 43 of the working stroke. The air spring and the vehicle's suspension system may be designed and tuned in such a way that the air spring is most of the time at a length that lies somewhere in between the upper limit 42 and the lower limit 43 of the working stroke. This location is referred to as the normal operating height 45.

Figure 6:
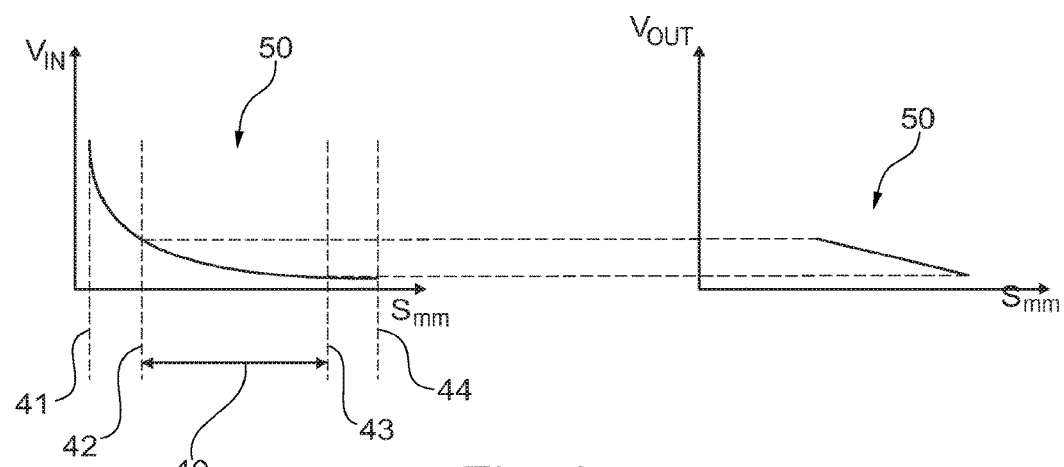
FIG. 6 illustrates the height measurement signal of an air spring height sensor according to a further exemplary embodiment of the invention.

FIG. 6 illustrates a height measurement signal 50 in a diagram representing the output voltage Vin of the transmitting unit dependent on the distance S between the transmitter unit 102 and the receiver unit 101. Locating the transmitter unit closer to the receiver unit will result in the height measurement signal be higher. The height measurement signal 50 may in particular decrease exponentially with increasing distance S.

In one embodiment, the air spring height sensor as described above and hereinafter may have to be functional only in the middle section of the working stroke, i.e. between the upper limit 42 and the lower limit 43 of the air spring, covering the entire area referred to as "normal operating range" of the working stroke. When exceeding the "normal operating range", it may be sufficient that the air spring height sensor is reporting "out of range above" (when exceeding the upper limit 42 towards the physical upper limit 41, which values are also shown on the S-scale in the diagram illustrated in FIG. 6) or "out of range below" (when exceeding the lower limit 43 towards the physical lower limit 44) the normal operating range. Using this logic allows that the air spring height sensor may not have to be able measuring the entire distance from the physical upper limit 41 to the physical lower limit 44.

Figure 7:
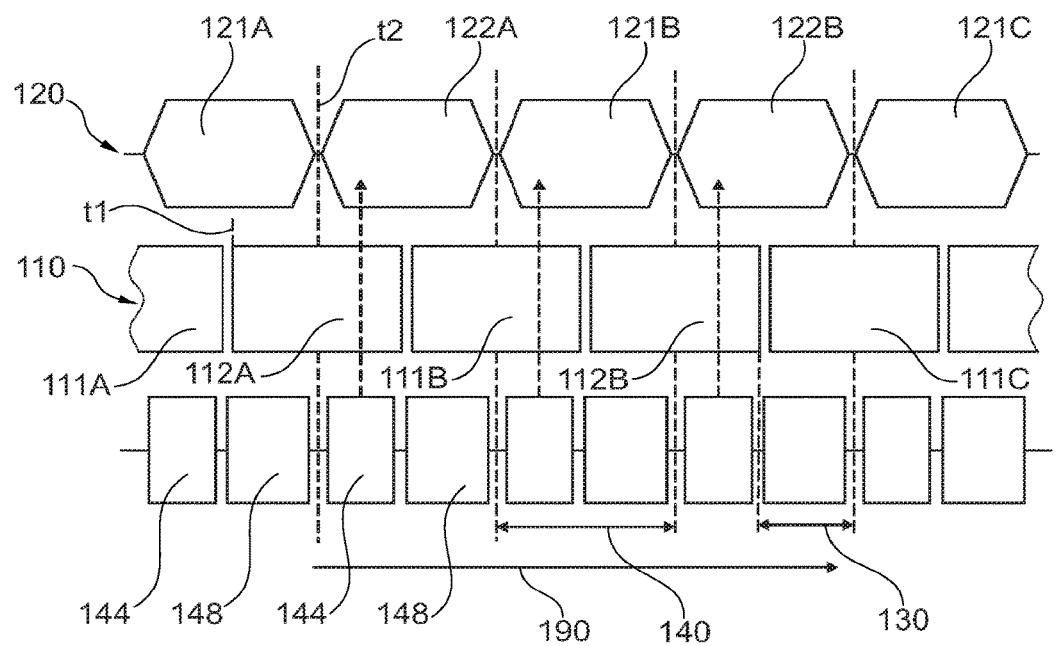
FIG. 7 illustrates the switching of the carrier frequency of an air spring height sensor according to a further exemplary embodiment of the invention.

FIG. 7 illustrates the carrier frequency and in particular the transmitter frequency 120 and the receiver filter frequency 110 as well as the evaluating steps 144, 148 carried out by the evaluation unit, wherein the illustration occurs over an arrow 190 representing the time line.

The transmitter frequency 120 changes periodically between the first frequency 121 and the second frequency 122. The switching between the first frequency and the second frequency is being controlled by the carrier frequency switching unit 103, which is not shown in FIG. 7. The time slot during which the same carrier frequency is transmitted by the transmitter unit is called measuring cycle 140.

The receiver filter frequency 110 is shown below the illustration of the transmitter frequency 120, wherein the carrier frequency switching unit controls the filtered carrier frequency, i.e. the receiver filter frequency letting pass the first frequency 111 or the second frequency 112.

As can be clearly seen from FIG. 7, there is a time delay 130 between the first point of time t1 and the second point of time t2, wherein the first point of time t1 represents the initial time of one of the first frequency 111 and the second frequency 112 of the receiver filter frequency 110 and wherein the second point of time t2 represents the initial time of the corresponding first frequency 121 and the second frequency 122 of the transmitter frequency 120. In particular the time delay 130 is a positive time delay, meaning that the receiver filter frequency is switched to one of the first frequency and the second frequency prior to switching the transmitter frequency to the corresponding frequency of the first frequency and the second frequency. In other words, the following inequality is valid in this example: t2−t1>0.

This relation can be derived from the illustration shown in FIG. 7 as the first frequency 111A of the receiver filter frequency 110 belongs to the first frequency 121A of the transmitter frequency 120. The same applies for the second frequencies 112A and 122A of the receiver filter frequency and of the transmitter frequency, respectively. Accordingly, the frequencies with the literal B and C belong to each other as explained with respect to the literal A of the first frequency and the second frequency.

Further, FIG. 7 illustrates the processes of measuring the height of the air spring and determining whether one of the first frequency and of the second frequency is free or blocked. For example, during the measuring process 144 of the second frequency 112A of the receiver filter frequency, the second frequency 122A of the transmitter frequency is used for determining the height of the air spring, which is indicated by the doted arrow starting from the functional block 144 and indicating upwards towards the second frequency 122A of the transmitter frequency 120. Subsequently, the receiver filter frequency 110 is switched to the first frequency 111B, wherein when the receiver filter frequency is switched, the transmitter frequency 120 is still sending with the second frequency 122A. As long as the transmitter frequency 120 is still sending with the second frequency 122A, the frequency checking process 148 may be carried out as the receiver filter frequency 111B may determine whether there is some signal or noise blocking the first frequency. In each case, until the transmitter frequency 120 has not been switched to the first frequency 121B, the receiver unit cannot receive any signal from the transmitter unit. The time for determining whether the first frequency 121B is blocked or free corresponds to the time delay 130, i.e. t2−t1. When the time delay 130 has elapsed and the first frequency has been found to be free, then the first frequency may be used for correctly determining the height of the air spring, as there is no other signal or noise using the first frequency. If the first frequency has been found to be blocked, then the measuring process may also be carried out, but the measured height value may be classified as corrupted or wrong. The steps described above containing the functional blocks 144 and 148 may be called a measuring period starting with determining a frequency's status and after that performing a height measurement using that frequency.

In this exemplary embodiment only one operational frequency is used at any given time. In FIG. 7, the two fixed and different operational frequencies are called first frequency 111, 121 and second frequency 112, 122. The time line in this diagram goes from left to right according to the arrow 190.

The signal transmitter frequency 120 is alternating between the two fixed operational frequencies 121 and 122. The transmission time may be fixed (constant) for each frequency block. As an example, the transmitter is working with the first frequency 121 for 10 ms, and is then switching to the second frequency 122. Then the transmitter is working with the second frequency 122 for 10 ms before switching back to the first frequency 121 again. Of course, any other length of time can be chosen here.

After the transmitter frequency has been switched over (like from 121 to 122), the receiver unit is performing its work, in this case: measuring the distance or the height of the air spring, see functional block 144. To do so, the receiver has to use an electronic signal filter that has been adjusted to the new measurement frequency. Setting the receiver filter frequency to the Frequency 122 will enable the height measurement.

After the sensor measuring activity has been completed, i.e. after measuring the distance between two points or the height of the air spring, the receiver filtering frequency will switch from the second frequency 122 to the first frequency 121. This switching of the receiver signal filter frequency to the next-to-be-used operational frequency has to happen while the transmitter is still using the second frequency 122. This way the receiver circuit can pre-evaluate (or: test) that the next-to-be-used frequency (in this case the first frequency 121) is not used or is not blocked by anything else.

Figure 8:
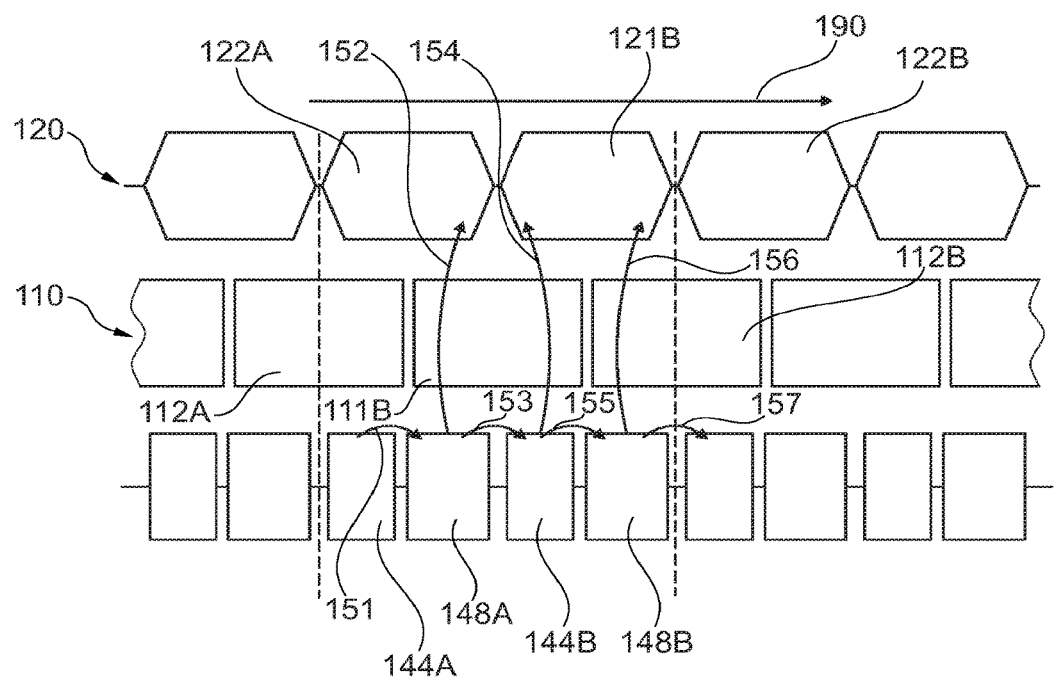
FIG. 8 illustrates the switching of the carrier frequency of an air spring height sensor according to a further exemplary embodiment of the invention.

FIG. 8 illustrates a diagram similar to that shown in FIG. 7 wherein the order of the performed steps is illustrated in more detail.

Starting with the functional block 144A, the height is measured using the second frequency 112A of the receiver filter frequency 110 and the second frequency 122A of the transmitter frequency 120. Subsequently, (indicated by arrow 151) the functional block 148A is used for determining whether the first frequency is free or blocked (arrow 152), as the receiver unit is receiving using the first frequency 111B while the transmitter frequency is still the second frequency 122A. Then, the next measuring cycle starts (arrow 153) with the functional block 144B, as the first frequency 111B and the first frequency 121B are used for measuring the height of the air spring (arrow 154). Subsequently (arrow 155), indicated by the functional block 148B, it is determined whether the second frequency is blocked or free as the receiver unit receives using the second frequency 112B and the transmitter unit transmits using the first frequency 121B (arrow 156). The next step (arrow 157) again is measuring the height using the second frequency 112B and the second frequency 122B, which corresponds to a new measuring cycle.

FIG. 8 allows summarizing the working process of an exemplary embodiment of the air spring height sensor as described above and hereinafter in a sequential way:

Arrow 151: after the sensor has measured the distance between two locations, using the operational frequency 112A, 122A, the receiver filter frequency 110 is switched to the frequency 111B.

Arrow 152: While the transmitter is still transmitting using the frequency 122A, the receiver is now using the newly set filter frequency 111B to pre-evaluate the next-to-be-used frequency 121B. Under ideal circumstances, the frequency 121B is "free" and not interfered with or by any other signal source. In such a case the controller will treat the measurement to follow to be valid.

Arrow 153: The transmitter is now switching from the frequency 122A to the frequency 121B, and at that moment the receiver electronics will switch from pre-evaluation mode 148A to the measurement mode 144B.

Arrow 154: For a predefined time the sensor system will now perform its measurement activity, using the frequency 111B.

Arrow 155: After a predefined time, the receiver controller will switch from the measurement mode 144B back to the pre-evaluation mode 148B. The receiver filter frequency gets switched to the frequency 112B.

Arrow 156: The receiver controller activates the pre-evaluation mode 148B to test if the frequency 122B is already used by anything else or that the frequency 122B is free.

Arrow 157: The signal transmitter switches from 121B to 122B and is now transmitting on this new frequency. At this moment the sensor system will now execute the measurement mode for a previously defined time before switching the receiver filter frequency again.

The benefits of this solution may be characterized as follows: the sensor system output provides real-time measurement results and not time delayed measurements; continuous mode of signals, i.e. high signal bandwidth (not to be interrupted by any calculations as it may be the case when using other algorithms); the electronics circuit needs only to operate at two different frequencies, and not at three or more, which may keep the electronics less complex and cheaper.

One important issue may be the synchronization between the switching events: transmitter is switching the operational frequencies, and the receiver is switching its signal filter accordingly, which events may have to be synchronized. After a pre-set time has elapsed when transmitting a frequency block, the receiver signal has to switch to the next-to-be-used frequency. In other words, this event (switching the receiver signal filter) has to happen after a given time delay, for example after 50% of the time for transmitting a frequency block has elapsed. Almost any other time ration may be applicable as well.

In the case of the air spring height sensor, there may be no wired connection between the transmitter unit and the receiver unit, i.e. the transmitter cannot signalize directly to the receiver controller to switch its filter frequency. In such a case the receiver has to work-out by itself by when it has to switch the filter frequency.

If and when the synchronization between transmitter frequency switching and receiver filter frequency switching gets out of synchronization, then the frequency hopping approach may be no longer functional, i.e. the system is not capable to detect when a sensor measurement cannot be used because of the presence of EMI (Electro Magnetic Interference) signals or the absence of a transmitting signal at a frequency corresponding to the receiver filter frequency.

Figure 9:
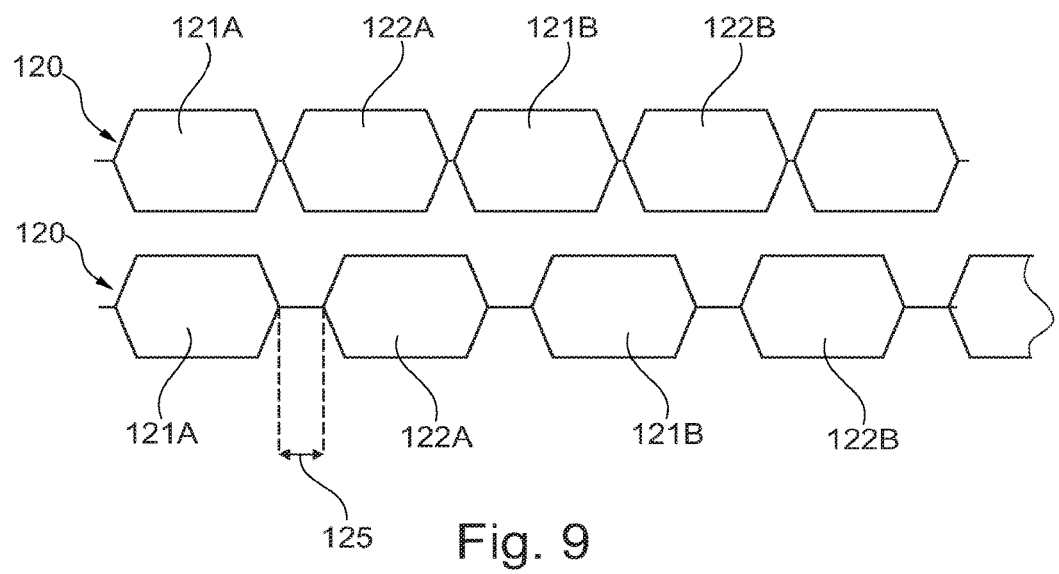
FIG. 9 illustrates the carrier frequency of the air spring height sensor according to a further exemplary embodiment of the invention.

FIG. 9 illustrates two different transmitter frequency signals 120, wherein the upper signal corresponds to the transmitter frequency shown in FIGS. 7 and 8 and wherein the lower signal form comprises a transmission break 125 when switching from the first frequency 121 to the second frequency 122.

As shown in FIG. 9, there are two possible options available about switching between the two frequencies 121 and 122. In a first variant as shown in the upper transmitter frequency signal, no transmission break is carried out when switching between the two different frequencies back and forth. In a second variant as shown in the lower transmitter frequency signal, a transmission break 125 is carried out for a fixed time when switching between the two frequencies 121 and 122.

The lower signal form, i.e. with transmission break 125 when switching from the first frequency 121 to the second frequency 122 or vice versa is using the change or the switching of the operational frequency as a synchronization signal. To ensure that the synchronization between the transmitter and the receiver is done reliably, an additional transmission break 125 is added by the transmitter when switching between the two fixed operational frequencies 121 and 122.

The upper of the two transmitter signal sequences shows that there is pause between the two different frequencies transmitted. The lower transmitter signal sequence includes a signal-free time sequence when switching from one to the other transmitter frequency. This signal pause may be easier to detect by the receiver circuit and therefore can be used as a more reliable time-sequence synchronization marker. As the lower signal form may need more time to execute a number of transmitter signal sequence changes, the sensor signal bandwidth may be lowered. Therefore, the transmitted signal block may be shortened to make room for the signal pause times, as will be explained with reference to FIG. 10.

Figure 10:
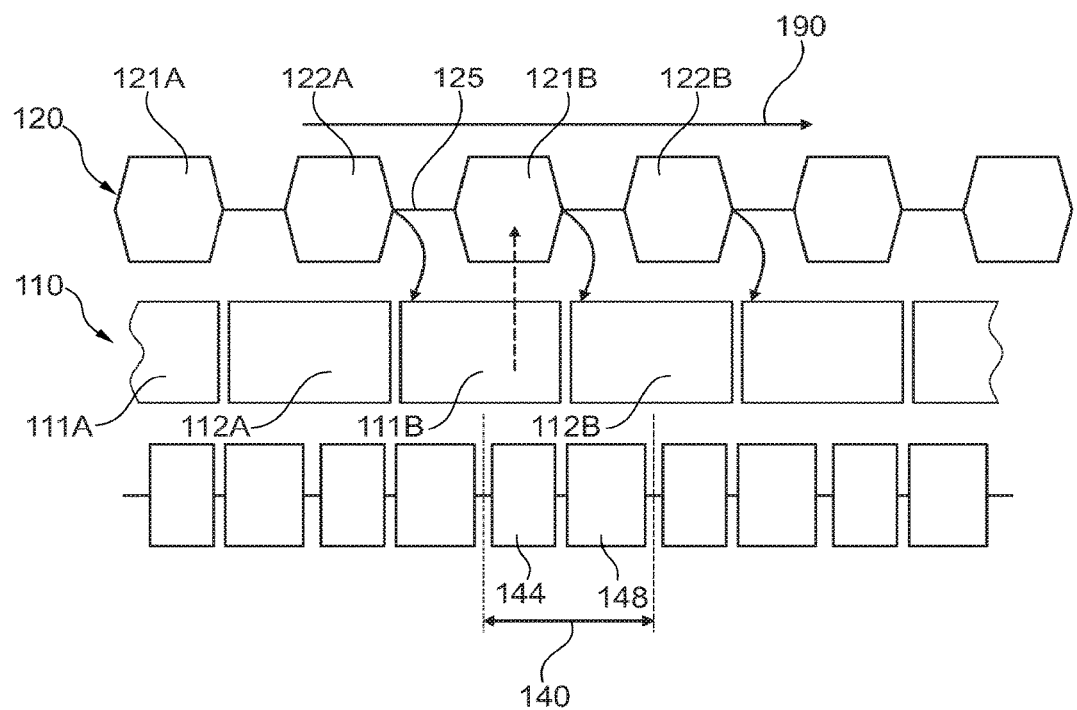
FIG. 10 illustrates the switching of the carrier frequency of an air spring height sensor according to a further exemplary embodiment of the invention.

FIG. 10 illustrates a transmitter frequency 120 with shortened time length for applying the first frequency 121 and the second frequency 122 as to provide a transmission break 125 between the frequency switching processes by keeping the frequency switching process of the receiver filter frequency 110 unamended or constant compared to the exemplary embodiments described above. Thus, the signal bandwidth may not be lowered and the transmission break 125 between the first frequency and the second frequency of the transmitter frequency enables a synchronization of the receiver filter frequency with respect to the transmitter frequency.

The end of the transmission of one of the two operational frequencies indicated by the arrows from the transmitter frequency 120 to the receiver filter frequency 110 marks the point at which the receiver signal has to be switched to the other, next-to-be-used frequency. This frequency hopping solution may be as fast as the one described above without a transmission break in the transmitter frequency, but may provide more reliability as the synchronization point is easier to detect by the receiver controller.

Figure 11:
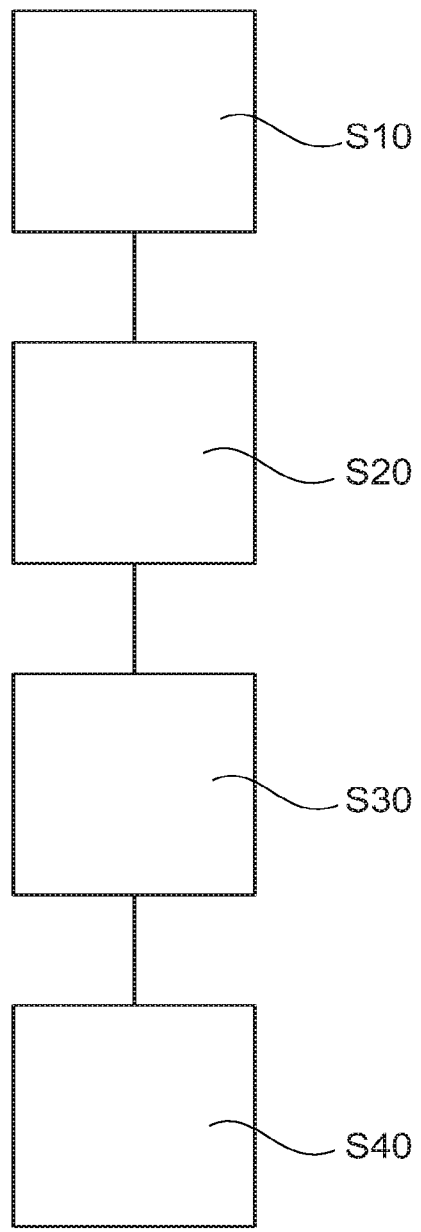
FIG. 11 illustrates a schematic view of an air spring height measuring method according to a further exemplary embodiment of the invention.

FIG. 11 schematically illustrates the steps of an exemplary embodiment of the air spring height measuring method.

In a first step S10, a carrier frequency 110 of a frequency filter of an evaluation unit 200 is switched at a predetermined first point of time t1, evaluating a sensed height signal 50 of a receiver unit 101 being mounted to a first mounting element 10 of an air spring 1, from one of a first carrier frequency 111 and a second carrier frequency 112 to the other one of the first carrier frequency 111 and the second carrier frequency 112.

In a second step S20, it is detected after the first point of time t2 whether the carrier frequency 111, 112 is sufficiently free of interferences.

In a third step S30, the carrier frequency 121, 122 of a transmitter unit 102 is switched at a predetermined second point of time t2, for transmitting a height measuring signal 50, which transmitter unit 102 is being mounted to a second mounting element 20 of an air spring 1, to a corresponding carrier frequency 111, 112 of the frequency filter.

In a fourth step S40, the sensed height signal 50 is evaluated when the carrier frequency 121, 122 of the transmitter unit 102 corresponds to the carrier frequency 111, 112 of the frequency filter and if the carrier frequency is sufficiently free of interferences.

In a fifth step S50, the transmission of the transmitter unit 102 is interrupted at least partially between the first point of time t1 and the second point of time t2.

This application claims benefit of European Patent Application Serial No. EP 12193661, filed on Nov. 21, 2012. While certain representative embodiments and details have been shown for the purpose of illustrating the subject invention, it will be apparent to those skilled in this art that various changes and modifications can be made therein without departing from the scope of the subject invention.

What is claimed is:

1. An air spring height sensor comprising:
   a transmitter unit for transmitting a height measuring signal,
   a receiver unit for sensing a height signal,
   a carrier frequency switching unit, and
   an evaluation unit,
   wherein the transmitter unit is switchable between a first carrier frequency and a second carrier frequency of the height measuring signal,
   wherein the evaluation unit comprises a frequency filter being switchable between the first carrier frequency and the second carrier frequency,
   wherein the carrier frequency switching unit is adapted for switching the frequency filter at the receiver unit from the first carrier frequency to the second carrier frequency at a predetermined first point of time (t1) and for switching a carrier frequency of the transmitter unit from the first carrier frequency to the second carrier frequency at a predetermined second point of time (t2),
   wherein the first point of time is prior to the second point of time,
   wherein the evaluation unit is adapted for detecting, after the first point of time but prior to the second point of time, whether the first carrier frequency or the second carrier frequency is sufficiently free of interferences for subsequent evaluation of the height measuring signal, and
   wherein the first carrier frequency or the second carrier frequency is sufficiently free of interferences when a signal to noise ratio of the sensed height signal meets or exceeds a threshold.

2. The air spring height sensor according to claim 1, wherein the receiver unit and the transmitter unit are adapted for being mounted to opposing mounting elements of an air spring.

3. The air spring height sensor according to claim 1, wherein the evaluation unit is adapted for detecting after the first point of time and before the second point of time whether the second carrier frequency is sufficiently free of interferences for subsequent evaluation of the height measuring signal.

4. The air spring height sensor according to claim 1, wherein the evaluation unit is adapted for detecting after the first point of time and before the second point of time whether the first carrier frequency is sufficiently free of interferences for subsequent evaluation of the height measuring signal.

5. The air spring height sensor according to claim 1, wherein the carrier frequency switching unit is adapted for alternately switching the carrier frequency of the frequency filter and the transmitter unit between the first carrier frequency and the second carrier frequency.

6. The air spring height sensor according to claim 1, wherein the carrier frequency switching unit is adapted for periodically switching the frequency filter from the first carrier frequency to the second carrier frequency of the receiver unit at a periodic predetermined first point of time (t1) and for switching the carrier frequency of the transmitter unit from the first carrier frequency to the second carrier frequency at a respective predetermined second point of time (t2).

7. The air spring height sensor according to claim 1, wherein the air spring height sensor is adapted for interrupting a transmission of the transmitter unit at least partially between the first point of time and the second point of time.

8. The air spring height sensor according to claim 1, wherein the air spring height sensor is adapted for interrupting a transmission of the transmitter unit between the first point of time and the second point of time.

9. The air spring height sensor according to claim 1, wherein the carrier frequency is between 1 kHz and 1 MHz, in particular the carrier frequency is between 10 kHz and 100 kHz.

10. The air spring height sensor according to claim 5, wherein an alternating rate from the first carrier frequency to the second carrier frequency or from the second carrier frequency to the first carrier frequency between 1 Hz and 1 kHz.

11. The air spring height sensor according to claim 10, wherein the alternating rate is within the range of 10 Hz to 100 Hz.

12. The air spring height sensor according to claim 1, wherein a ratio of a duration between the first point of time and the second point of time and a duration where the carrier frequency of the transmitter unit corresponds to the carrier frequency of the frequency filter is between 0.2 and 5.

13. The air spring height sensor according to claim 1, wherein a ratio of a duration between the first point of time and the second point of time and a duration where the carrier frequency of the transmitter unit corresponds to the carrier frequency of the frequency filter is between 0.5 and 2.

14. The air spring height sensor according to claim 1, wherein a ratio of a duration between the first point of time and the second point of time and a duration where the carrier frequency of the transmitter unit corresponds to the carrier frequency of the frequency filter is between 0.8 and 1.2.

15. An air spring comprising:
a first mounting element being adapted for being mounted to a first vehicle portion;
a second mounting element being adapted for being mounted to a second vehicle portion being movable with respect to the first vehicle portion;
an air volume limited by a resilient belly having a first edge and a second edge, which belly with the first edge is sealed to the first mounting element and with the second edge is sealed to the second mounting edge;
the air spring height sensor of claim 1,
wherein the transmitter unit is mounted to the first mounting element, and wherein the receiver unit is mounted to the second mounting element as to sense the height signal with respect to the first mounting element.

16. An air spring height measuring method, the method comprising:
switching at a predetermined first point of time a carrier frequency of a frequency filter of an evaluation unit from a first carrier frequency to a second carrier frequency, the second carrier frequency being different from the first carrier frequency;
evaluating a sensed height signal of a receiver unit being mounted to a first mounting element of an air spring from the first carrier frequency to the second carrier frequency or from the second carrier frequency to the first carrier frequency;
switching at a predetermined second point of time the first carrier frequency of a transmitter unit for transmitting a height measuring signal to the second carrier frequency of the frequency filter,
wherein the transmitter unit is mounted to a second mounting element of the air spring;
detecting, by the evaluation unit after the first point of time but prior to the second point of time, whether the first carrier frequency or the second carrier frequency is sufficiently free of interferences for subsequent evaluation of the sensed height signal, and
wherein the first carrier frequency or the second carrier frequency is sufficiently free of interferences when a signal to noise ratio of the sensed height signal meets or exceeds a threshold.

17. The air spring height measuring method according to claim 16, wherein switching the carrier frequency of the frequency filter comprises periodically switching the carrier frequency at a periodic predetermined first point of time and switching the carrier frequency of the transmitting unit comprises periodically switching the carrier frequency at a respective periodic predetermined second point of time.

18. The air spring height measuring method according to claim 16, further comprising interrupting the transmission of the transmitter unit at least partially between the first point of time and the second point of time.

19. The air spring height measuring method according to claim 17, further comprising interrupting the transmission of the transmitter unit at least partially between the first point of time and the second point of time.

20. A method comprising:
switching, at a first point of time, a carrier frequency of a frequency filter of an evaluation unit from a first carrier frequency to a second carrier frequency different from the first carrier frequency;
detecting a sensed height signal of a receiver unit of an air spring switched from the first carrier frequency to the second carrier frequency or from the second carrier frequency to the first carrier frequency;
detecting, by an evaluation unit after a first point of time but prior to a second predetermined point of time, whether the first carrier frequency or the second carrier frequency is sufficiently free of interferences for subsequent evaluation of the sensed height signal; and
switching at the predetermined second point of time the carrier frequency of a transmitter unit for transmitting a height measuring signal to a corresponding carrier frequency of the frequency filter, wherein the transmitter unit is mounted to a second mounting element of the air spring,
wherein the first carrier frequency or the second carrier frequency is sufficiently free of interferences when a signal to noise ratio of the sensed height signal meets or exceeds a threshold.

* * * * *